United States Patent
Skoog

[19]

[11] Patent Number: 6,081,591
[45] Date of Patent: Jun. 27, 2000

[54] SIGNALING NETWORK GATEWAY DEVICE AND METHOD FOR USE IN A SIGNALING NETWORK

[76] Inventor: Frederick H. Skoog, 127 Cheeksparger Rd., Colleyville, Tex. 76034

[21] Appl. No.: 08/840,866

[22] Filed: Apr. 16, 1997

[51] Int. Cl.[7] .............................. H04M 7/00; H04J 3/02; H04J 3/12

[52] U.S. Cl. ......................... 379/230; 370/401; 370/467; 379/220

[58] Field of Search ..................................... 379/207, 219, 379/220, 221, 229, 230; 370/401, 466, 467, 389, 422

[56] References Cited

U.S. PATENT DOCUMENTS

| 5,099,475 | 3/1992 | Kozaki et al. ............................ 370/422 |
| 5,420,916 | 5/1995 | Sekiguchi ................................. 379/230 |
| 5,613,068 | 3/1997 | Gregg et al. .......................... 370/389 X |
| 5,640,446 | 6/1997 | Everett et al. ............................ 379/115 |
| 5,838,782 | 11/1998 | Lindquist ............................. 379/207 X |

FOREIGN PATENT DOCUMENTS

| 0317170 | 5/1989 | European Pat. Off. ......... H04L 11/20 |
| 9315583 | 8/1993 | WIPO .............................. H04M 7/00 |

OTHER PUBLICATIONS

Barnes, Tony, "Gateway to the World," *Telesis*, 1991, pp. 15–25.

*Primary Examiner*—Harry S. Hong

[57] ABSTRACT

A signaling network gateway device (12) is provided for use in a signaling network (10), such as a Signaling System 7 signaling network. The signaling network gateway device (12) includes a protocol interface unit, a signaling transport unit, and a signaling gateway control unit (58). The protocol interface unit converts signaling information between a first format and a second format and exchanges signaling information in the second format with a user access element, such as a digital loop carrier (26), of the signaling network (10). The protocol interface unit may include any number of individual protocol interface units such as an ISDN protocol interface unit (50), a future protocol interface unit (52), a TAPI/TSAPI protocol interface unit (54), and an SS7 protocol interface unit (56). The signaling transport unit performs link speed conversion on the signaling information in the first format so that the signaling information may be exchanged with a transport signaling link, such as a link (15), of the signaling network (10) at a desired rate. The signaling transport unit may include any number of individual signaling transport units such as an SS7 signaling transport unit (68) and an SS7/ATM signaling transport unit (70). The signaling gateway control unit (58) controls an exchange of signaling information in the first format between the signaling transport unit and the protocol interface unit.

43 Claims, 2 Drawing Sheets

SIGNALING NETWORK GATEWAY DEVICE AND METHOD FOR USE IN A SIGNALING NETWORK

TECHNICAL FIELD OF THE INVENTION

This invention relates generally to the field of telecommunications and more particularly to a signaling network gateway device and method for use in a signaling network such as a Signaling System 7 network.

BACKGROUND OF THE INVENTION

Signaling in a telecommunications network is the act of transferring signals or signaling information pertaining to call management and processing. Signaling is simply the information exchanged between switching nodes or signaling transfer points and may be used to perform four basic functions: supervising, alerting, addressing, and billing. Supervising involves monitoring the status of a line or circuit to see if it is busy, idle, or requesting service. In an automated telecommunications network, supervisory signaling information is provided to reflect or direct the status of a line or a circuit such as the on-hook/off-hook status. Alerting or notifying involves providing signaling information indicating the arrival of an incoming call at the end user's telephone device. Addressing involves providing address signaling information indicating the address of a calling party, a called party, or a telecommunications network element. The address signaling information is used for transmitting routing and destination signals over the network. Billing involves providing signaling information to properly bill a call such as by providing information regarding the billing number, the duration of a call, and the level of service.

In most telecommunications applications, the user provides signaling information along with the voice or data signal and the signaling is thus referred to as in-band signaling. In-band signaling is primarily provided using multi-frequency and single frequency signals that are provided along with the voice or data signal in the same circuit. For example, in-band signaling may include the use of tones which pass within the voice frequency band and are carried along the same circuit as the talk path that is being established by the signaling information. In-band signaling suffers several disadvantages such as a reduction in available bandwidth for transmitting information because of the presence of the signaling information. Another disadvantage includes the use of full bandwidth channels to provide signaling information that requires only a fraction of this bandwidth in many situations. In-band signaling also increases the accessability of sensitive information such as billing, addressing, and monitoring information which increases the opportunity for fraud. Further disadvantages of in-band signaling includes relatively slow performance when setting up and disconnecting circuits.

As a result of these and other disadvantages, a completely separate signaling network was developed that is dedicated to providing signaling information separately from the channel or circuit carrying the content such as voice or data information. This may be referred to as out-of-band signaling and has been implemented, primarily, to provide inter-office signaling. Out-of-band signaling increases the overall network bandwidth and allows for more sophisticated telecommunications services to be provided because of the added flexibility of providing content through one network and signaling through another. For example, signaling information may be exchanged over the signaling network between an originating switching system and a destination switching system before a content or traffic circuit is established to determine if the called station is busy. If busy, a content circuit or channel is not established allowing it to be used for another call.

Out-of-band signaling was first implemented using common channel interoffice signaling (CCIS) for transmitting signaling information for a group of trunks over a separate channel. CCIS uses packet switches in its signaling network that may be referred to as signal transfer points (STPs). Today, signaling networks are using a newer out-of-band signaling system and protocol developed by the International Telegraph and Telephone Consultative Committee (CCITT) which is called Signaling System 7 (SS7). SS7 uses an out-of-band signaling protocol that may be implemented in digital signaling networks. SS7 provides a layered functional structure and uses destination routing, octet oriented fields, variable length messages, and a highly reliable message transfer protocol. SS7 also provides flow control, connection and connection-less services, and Integrated Services Digital Network (ISDN) capabilities. Out-of-band signaling solves many of the disadvantages associated with in-band signaling.

A typical out-of-band signaling network will include a local digital switch, transmission facilities with associated transport devices including a first channel bank and a second channel bank, an STP, and a service control point (SCP). The STP may be implemented as a specialized packet switch optimized for SS7 packets. The SCP may be used to control an associated local digital switch, or a tandem switch in other embodiments, that supports intelligent network services. In such a case, the local digital switch may be referred to as a service switching point (SSP). The local digital switch and the first channel bank may be employed at a local central office, and the first channel bank may be coupled to the second channel bank located at a second location through a high-speed transmission facility so that signaling information may be exchanged in both directions. The second channel bank may couple to the STP which then couples to the SCP also located at the second location. The second location may be provided anywhere such as another central office, a tandem switch office, or an inter-exchange carriers tandem switch office. The local digital switch receives line and address signaling information from users through subscriber loops and interfaces such as digital subscriber loops, loop carrier systems, and digital cross-connect switches. The local digital switch then provides the signaling information to the first channel bank where it is sent to the STP through network transmission facilities and the second channel bank. The channel banks serve as transmission systems that condition the signaling information so that it may be transmitted across a high-speed network transmission facilities between two network office locations.

In such a signaling network, signaling information may be exchanged in both directions. For example, signaling information may be received at the local digital switch and provided to the first channel bank. The first channel bank serves as a transmission system to condition the signaling information for transport on a high-speed circuit, such as a T-1 circuit, so that the information may be provided to the second channel bank at the second location. For example, the signaling information may be provided at a digital signal, level zero (DS0) rate and is then combined into a digital signal, level one (DS1) rate for transmission on the high-speed transport facility. The second channel bank also serves as a transmission system and terminates the high-speed transport facility carrying the signaling information and demultiplexes it back into its individual signaling information links to be provided to the STP for routing to the SCP or another SSP. The SCP may be implemented as a computer and associated database that includes network and customer-specific information to perform such tasks as call routing and number (address) translation to deliver network services. As a result of querying the SCP, additional signaling information, such as routing and translation signaling information, may be generated and provided to other STP's from the local STP so that appropriate switching and services may be established and provided.

Telecommunications services, such as services provided by the advanced intelligent network (AIN), are becoming more sophisticated and prevalent. Furthermore, new signaling protocols and standards, such as the telephony application programming interface (TAPI) and the telephony services or server applications programming interface (TSAPI), are becoming more prevalent and available to provide local call processing and control at a user access element such as a private network. Unfortunately, the typical out-of-band interoffice signaling network configuration described above does not allow for signaling information to be easily and conveniently exchanged with non-traditional signaling information end points or user access elements. This prevents enhanced local control and call processing.

Non-traditional signaling information end points are those access elements that cannot or do not normally receive signaling information and thus do not serve as signaling end points. Currently, the local digital switch is the only traditional end point capable of providing and receiving signaling information and signaling traffic in a local central office. The non-traditional signaling information end points or user access elements may include such elements as digital loop carrier equipment, digital cross-connect systems, private telecommunication networks, computer networks, or computers and telecommunications systems implementing such protocols as TAPI and TSAPI. Non-traditional signaling information end points may also include private telecommunications networks and ISDN services with the capability to receive and process signaling information in such formats as Transaction Language 1 (TL1), X.25, and the various Q.9xx/Q.29xx signaling protocols and standards that may be used with ISDN and broadband ISDN (BISDN) services.

The inability to directly exchange signaling information between an interoffice signaling network and a user access element in a desired format prevents the expansion of the network control plane. The signaling information cannot be provided to non-traditional information end points or access elements in a desired format from either the local digital switch or the first channel bank. For a variety of reasons, the local digital switch, which receives the signaling information, cannot be easily modified to provide the signaling information to non-traditional end points or to convert the signaling information from one format to another. Digital switch manufacturers are reluctant to modify existing software to provide such capabilities. This inability to provide signaling information to non-traditional end points or access elements harms the overall public telecommunications network and the development of the more advanced telecommunications services, such as services provided by the advanced intelligent network (AIN). For example, as telecommunications system usage continues to rise, with the increased popularity of such services as Internet access and video services, the capability to use signaling information to route high bandwidth services to an appropriate high bandwidth switch to relieve congestion on existing local digital switches requires the ability to provide signaling information to non-traditional end points or access elements.

In existing signaling networks, the signaling information cannot be provided from the standard channel banks which are essentially provided as "dumb" transmission equipment without the capability or intelligence to convert signaling information from one format to another. The standard channel banks contribute to reduced reliability and are a potential source of link failures. The channel banks are further limited in that they cannot provide network security (firewall) capabilities to help prevent harm to the signaling network by eliminating bogus or fraudulent signaling traffic. The channel banks cannot apply priority services for selected message flows and cannot provide message traffic statistics to support signaling network diagnostics or inter-service provider billing capabilities. Furthermore, the channel banks cannot provide link concentration to carry multiple access link traffic flows on a common link into the interoffice signaling network backbone or SS7 backbone. As such, access elements, such as multiple private networks, can access the signaling network only by providing dedicated, signaling transmission facilities to communicate directly with the STP. These signaling transmission facilities are expensive and frequently must be provided over long distances. Additionally, expensive interface hardware must be provided for each private network accessing the STP.

SUMMARY OF THE INVENTION

From the foregoing it may be appreciated that a need has arisen for a signaling network gateway device and method for use in a signaling network that eliminate or reduces the problems of prior techniques by making signaling information available at non-traditional signaling end points. In accordance with the present invention, a signaling network gateway device and method for use in a signaling network, such as a Signaling System 7 network, are provided which substantially eliminate the disadvantages and problems outlined above. The present invention allows enhanced and more advanced telecommunication services to be implemented by expanding the network control plane and providing signaling information to non-traditional signaling network end points that allow for enhanced signaling control and local call management.

According to an embodiment of the present invention, a signaling network gateway device for use in a signaling network is provided. The signaling network gateway device includes a protocol interface unit, a signaling transport unit, and a signaling gateway control unit. The protocol interface unit converts signaling information between a first format and a second format and exchanges signaling information in the second format with a user access element of the signaling network. The signaling transport unit performs link speed conversion the e signaling information in the first format so that the signaling information may be exchanged with a transport signaling facility or link of the signaling network at a desired rate. Finally, the signaling gateway control unit controls an exchange of signaling information in the first format between the signaling transport unit and the protocol interface unit.

The present invention provides a myriad of technical advantages originating generally from the capability to support non-traditional signaling end points in a signaling network. A technical advantage of the present invention allows access elements, such as multiple private networks, to conveniently and directly access the signaling network without the need for expensive signaling transmission facilities to access often remotely located STPs and without the need for expensive interface hardware at the STP. Still yet another technical advantage of the present invention allows for third party control of local switching resources via computer telephony integration (CTI) functionality and signaling protocols. A further technical advantage of the present invention includes enhanced signaling network connectivity to support new network based applications and signaling protocols. Yet another technical advantage includes signaling message transport to provide real time redirection of services to enhance overall telecommunications network operation. For example, services resulting in connect times substantially longer than an average voice path connect time may be rerouted to use other switches or access equipment to minimize congestion of the local digital switch. A list of still other technical advantages includes enhanced signaling network security, priority management, signaling traffic monitoring and metering, network overload protection, link management, protocol compatibility, signaling network reliability, and link speed conversion. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

Figure 1:
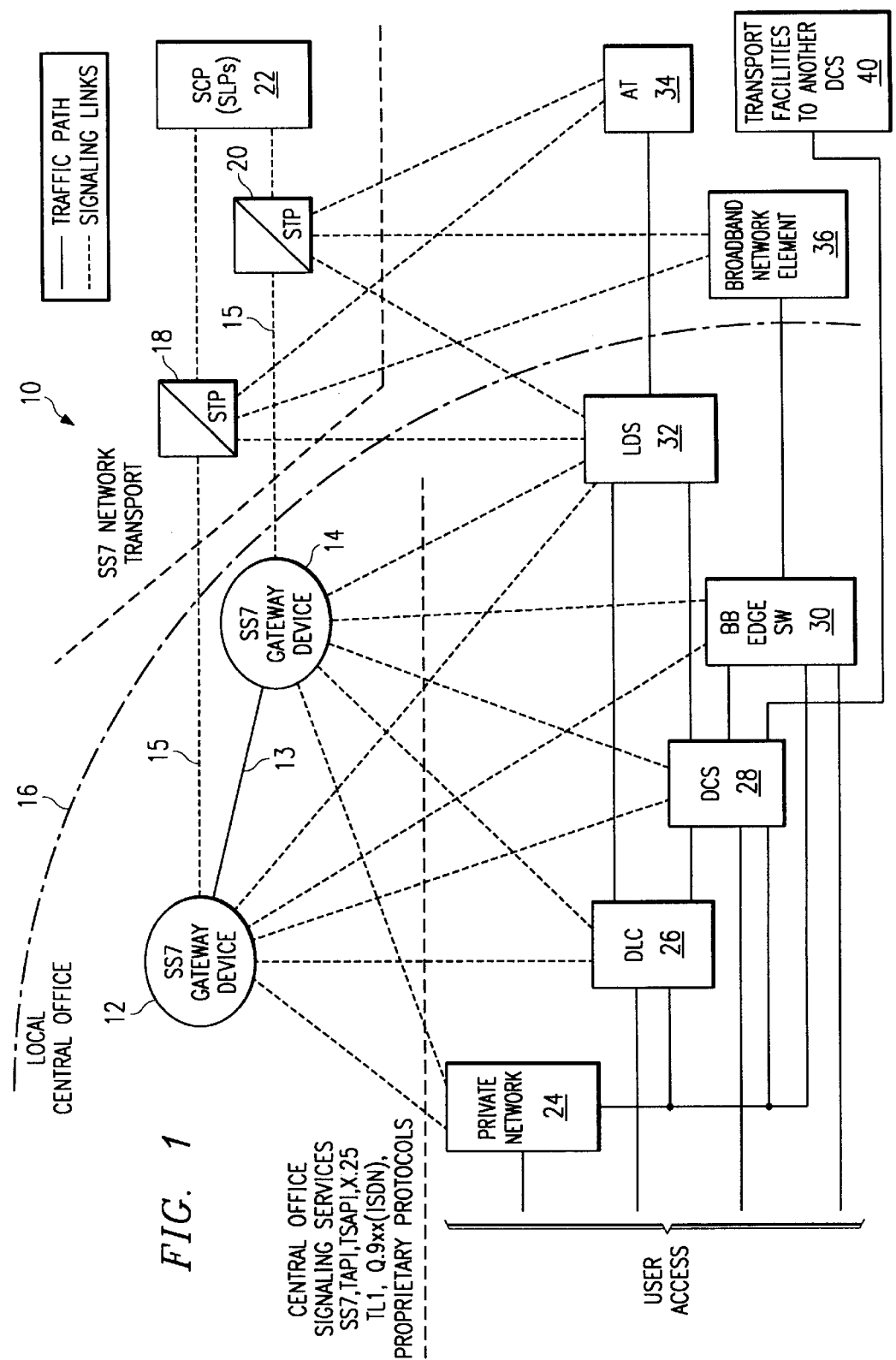
FIG. 1 is an overview block diagram illustrating redundant signaling network gateway devices provided in an exemplary signaling network such as a Signaling System 7 network.

FIG. 1 is an overview block diagram illustrating redundant signaling network gateway devices as provided in an exemplary signaling network 10. In a preferred embodiment, signaling network 10 may be implemented as a Signaling System 7 (SS7) network with the dashed lines provided between network elements representing signaling information paths and the solid lines representing traffic paths. The redundant signaling network gateway devices include a signaling network gateway device 12, that operates as a primary, and a signaling network gateway device 14, that operates as a backup or secondary. Signaling network gateway device 12 and signaling network gateway device 14 will preferably be directly coupled to one another using a link 13 as shown in FIG. 1 so that information may be periodically exchanged between the two gateway devices. This information, for example, may include state of health information, configuration verification information, traffic assurance information, traffic statistics information, and usage based billing information. This redundant arrangement increases the overall availability of signaling network 10 by allowing for a smooth transition between signaling network gateway device 12 and signaling network gateway device 14 in the event that control must be changed from primary to backup. This redundant arrangement also increases the overall reliability of signaling network 10.

Signaling network 10, in the one embodiment of FIG. 1, includes signaling network gateway device 12, signaling network gateway device 14, an STP 18, an STP 20, an SCP 22, a signaling end point, and a network end point. Each of the elements and end points of signaling network 10 may be identified and addressed using unique point codes. The signaling end point may be referred to as an access element and includes any element or node capable of receiving or exchanging signaling information, either directly or indirectly, with a user and with a signaling network gateway device. The signaling end point or access element may be a local signaling end point including any non-traditional signaling end point such as a private network 24, a digital loop carrier 26, a digital cross-connect system 28, and a broadband edge switch 30. These access elements are referred to as non-traditional signaling end points because they cannot or do not normally receive signaling information and thus do not serve as signaling end points.

The signaling end point or access element may also be a traditional signaling end point such as a local digital switch 32. In such a case, local digital switch 32, in certain embodiments, may also be used to access STP 18 and STP 20 directly, in addition to receiving or exchanging signaling information with a signaling network gateway device such as signaling network gateway device 12. In other embodiments, local digital switch 32 may only exchange signaling information with a signaling network gateway device. In some advanced implementations, local digital switch 32 may support signaling protocols in addition to the SS7 protocol. For example, local digital switch 32 may support TAPI and TSAPI to provide more advanced or extended network capabilities that are not provided or supported by the SS7 protocol. In such a case, local digital switch 32 may communicate with a signaling network gateway device of the present invention in a second format such as the TAPI or the TSAPI format and may communicate with an STP in a first format such as the SS7 protocol. The communication with the STP may occur using either a direct link with the STP or using a link with the signaling network gateway device.

The network end point of signaling network 10 may be referred to as a network element and generally includes any traditional signaling end point that may exchange signaling information with a signaling network gateway device through an STP. The network end point may include such end points as local digital switch 32, a broadband network element 36, an access tandem switch 34, a transport facility 40, as shown in FIG. 1, and another STP such as one provided at access tandem switch 34. Whenever a call is placed to a destination also served by a local central office 16, local digital switch 32 may serve as the network end point of signaling network 10.

As illustrated, a portion of signaling network 10 is provided within local central office 16. Local central office 16, in the one embodiment illustrated in FIG. 1, includes private network 24, digital loop carrier 26, digital cross-connect system 28, broadband edge switch 30, local digital switch 32, signaling network gateway device 12, and signaling network gateway device 14. However, it should be understood that this is only one embodiment of a possible local central office configuration and the present invention is in no way limited to this one particular configuration. Furthermore, it should be understood that although signaling network gateway device 12 and signaling network gateway device 14 are shown as being implemented as part of local central office 16, these gateway devices may in fact be implemented separately.

As mentioned above, signaling network 10 will preferably be implemented as an SS7 signaling network such that signaling information may be exchanged with STP 18 and STP 20 using the SS7 protocol or format. Generally, signaling information will be exchanged between signaling network gateway device 12 and STP 18, and between signaling network gateway device 14 and STP 20 in a first format such as the SS7 signaling protocol. Hence, signaling network gateway device 12 and signaling network gateway device 14 are labeled as SS7 gateway devices. In the description that follows, it is assumed that signaling network gateway device 12 and STP 18 are the primary and thus the description of their operation and exchange of signaling information applies also to the operation of signaling network gateway device 14 and STP 20 if signaling network gateway device 14 and STP 20 were the primary.

As mentioned previously, a signaling path may also be provided between local digital switch 32 and STP 18 and between local digital switch 32 and STP 20 so that signaling information may be directly exchanged between local digital switch 32 and the associated primary STP without going directly through an associated signaling network gateway device. The direct link between local digital switch 32 and STP 18 may be eliminated in alternative or future embodiments and the signaling information exchange between local digital switch 32 and STP 18 will occur through signaling network device 12. In this manner, the exchange may occur over a dedicated highspeed signaling facilities into STP 18. For example, this may include a direct T1 link into STP 18 or a Synchronous Optical Network (SONET) link using asynchronous transfer mode (ATM) into STP 18.

However, in other alternative embodiments, the signaling path implemented directly between local digital switch 32 and signaling network gateway device 12 may provide the capability to transport signaling information in both a first format and a second format. For example, assuming that local digital switch 32 supports the TAPI format along with the SS7 signaling protocol, signaling information may be exchanged using this link in both the TAPI format and the SS7 signaling protocol. In this manner, the capability to perform the more advanced or extended functions of local digital switch 32 that can be achieved only by using the TAPI format is provided. Thus, in any embodiment, local digital switch 32 may exchange signaling information with STP 18 in a first format such as the SS7 signaling protocol. However, depending on the embodiment, this may be done through a direct link or through signaling network gateway device 12.

Generally, signaling network gateway device 12 may exchange signaling information with local digital switch 32 and STP 18 in a first format, such as the SS7 signaling protocol, and may exchange signaling information with any of the access elements, including local digital switch 32, in a second format. In one embodiment of local digital switch 32, signaling information may be provided to signaling network gateway device 12 in a first format and received in a second format. In other embodiments, the first format is the same as the second format. Signaling network gateway device 12 will generally include a protocol interface unit that is capable of converting signaling information from the first format to any one of various second formats as desired. This capability to convert to various second formats may be upgraded or enhanced at any time to include essentially any other second format as new formats are developed and defined. The second format may be virtually any format such as TAPI format, TSAPI format, a CTI protocol, an Integrated Services Digital Network (ISDN) signaling protocol such as Q.931 and Q.2931, Transaction Language 1 (TL1) format, X.25 format, and even the SS7 signaling protocol which may need no protocol conversion or minimal protocol conversion.

Signaling network gateway device 12 will also generally include a signaling transport unit for exchanging signaling information with STP 18 at a desired rate. The signaling transport unit provides link speed conversion on the signaling information. The link or interface between signaling network gateway device 12 and STP 18 may be a high-speed signaling transport link that is capable of transporting signaling information at various rates such as a DS0 rate, a DS1 rate, a DS3 rate, a SONET transmission rate, and the like. The signaling information exchanged on these links may be transported in native SS7 packet format or adapted for transport in ATM cell format. Link 15 is shown in FIG. 1 as the link or interface coupling signaling network gateway device 12 to STP 18 and signaling network gateway device 14 to STP 20. Link 15 may be referred to as a transport signaling link and may be implemented using virtually any transmission media such as a copper cable, a coaxial cable, and fiber optic cable.

Thus, signaling network gateway device 12 may exchange information with any of a variety of access elements in any of a variety of second formats using the protocol interface unit. The protocol interface unit may then convert the signaling information from the second format to the first format and provide the signaling information to a signaling gateway control unit of signaling network gateway device 12. The signaling gateway control unit may then perform operation, administration, maintenance, and provisioning (OAM&P) functions and control the exchange of the signaling information to the signaling transport unit in a first format. The signaling transport unit then performs link speed conversion on the signaling information in the first format so that the signaling information may be provided to STP 18 at a desired rate. STP 18 may then communicate with any of a variety of network elements associated with a network service or application with the help of SCP 22. SCP 22 may include service logic programs (SLPs) or application programs for providing translation and routing information to STP 18 for identifying appropriate elements, such as network elements, using addresses such as signaling point codes.

Signaling network gateway device 12 and 14 will generally be implemented using a processor or a computer controlled using software. As mentioned above, each signaling network gateway device will generally include a protocol interface unit, a signaling transport unit, and a signaling gateway control unit. Each of these units may be implemented in software or in a combination of software and hardware. The protocol interface unit converts signaling information between a first format and a second format and exchanges signaling information in the second format with an access element of signaling network 10. The signaling transport unit performs link speed conversion on the signaling information in the first format so that the signaling information may be exchanged with signaling network 10 at a desired rate. The signaling gateway control unit controls the exchange of signaling information, preferably in the first format, between the signaling transport unit and the protocol interface unit. Additionally, the signaling gateway control unit may perform additional functions for the signaling network gateway device such as OAM&P, signaling information analyses to ensure network security and priority management, traffic statistics, billing information, and metering.

STP 18 and 20 may be implemented as packet switches to ensure that the signaling information is properly routed in a first format, such as the SS7 signaling protocol. As mentioned above, STP 18 and 20 may be implemented as a specialized packet switch optimized for SS7 packets. STP 18 and 20 rely on SCP 22 to provide translation and routing information so that the signaling information may be routed to the correct signaling element. As mentioned previously, SCP 22 may include SLPs or application programs to assist with providing translation and routing information. SCP 22 may be implemented as a computer and an associated database that includes customer-specific information to perform such tasks as call routing and translation to deliver network services. The signaling information generated by SCP 22 may include embedded signaling information in a second format that can be easily translated by signaling network gateway device 12 into the second format and then provided to the corresponding access element as determined by the address information in the signaling information. Stated differently, SCP 22 may generate signaling information in the first format that anticipates translation into a second format so that the signaling information may be easily converted by signaling network gateway device 12 into the second format. The second format is compatible with the destination access element and is used to control this access element. The second format includes any of a variety of available second formats.

In operation, signaling network 10 may be used to exchange signaling information to properly setup or establish a connection in a network. Signaling network 10, using signaling network gateway device 12, may be used to help reduce congestion at a switch such as local digital switch 32. For example, when establishing connections to a particular network element that is used to provide data services, such as an Internet service provider, which traditionally provides connection hold times well in excess of average voice connection hold times, the connection can be made through a dedicated or higher capacity switch such as broadband edge switch 30 instead of local digital switch 32.

As an example, a user coupled to local digital switch 32 through any access element, such as digital loop carrier 26, digital cross-connect system 28, and private network 24, may attempt to establish a connection to a network element outside of local central office 16. The user provides signaling information, either in-band or out-of-band, to local digital switch 32 which identifies the user and the destination address. Local digital switch 32 communicates the signaling information to STP 18, which is operating as the primary STP, in a first format such as the SS7 signaling protocol. In an alternative embodiment, local digital switch 32 provides the signaling information to STP 18 through signaling network gateway device 12. In such a case, local digital switch 32 provides the signaling information to signaling network gateway device 12 in the SS7 signaling format, and signaling network gateway device 12 then provides this signaling information to STP 18 also in the SS7 signaling format.

Assuming that the user desires to setup a connection with a network element, the signaling information is then provided from STP 18 to SCP 22 in the first format. In response, SCP 22 may execute an application program or service logic program to generate translation and routing type signaling information in the first format that is then provided back to STP 18. The translation and routing type signaling information will identify the network element associated with the destination address and an access element that the user should be coupled through instead of local digital switch 32 to help reduce congestion at local digital switch 32. The translation and routing type signaling information is then communicated to signaling network gateway device 12 and the designated network element in the first format. The signaling information generated by SCP 22 and provided to signaling network gateway device 12 may include embedded or anticipated signaling information that can be easily converted into a second format by signaling network gateway device 12 and that is compatible with the access element. This translation and routing type signaling information is used to setup the connection between the access element and the network element. The network element may, for example, include any outside element or switch such as access tandem 34, broadband network element 36, or transport facility 40 that may provide access to a remote digital cross-connect system. The network element will ultimately be used to exchange information with the user.

Signaling network gateway device 12 converts the translation and routing type signaling information it receives in the first format to a second format and then communicates this information to the designated access element in the second format as specified by the translation and routing type signaling information. The access element may be any available element or switch that may be connected with the user so that congestion may be relieved at local digital switch 32. Furthermore, the designated access element will generally be better capable of exchanging the desired type of information than will local digital switch 32 and will generally be a non-traditional signaling end point. In the illustration of FIG. 1, the access elements may include private network 24, digital loop carrier 26, digital cross-connect system 28, and broadband edge switch 30. The selected access element will receive the signaling information from signaling network device 12 in a second format that will generally be in a format different from the first format but could be provided in the same format as the first format such as the SS7 signaling format.

After all elements have been setup, communications may take place between the user and the desired service or called party and congestion will be reduced at local digital switch 32. For example, assuming that the user originally accessed local digital switch 32 through digital cross-connect system 28 and the selected access element is broadband edge switch 30, signaling network gateway device 12 may provide the translation and routing type signaling information to digital cross-connect system 28 so that the communications path may be established through broadband edge switch 30 to the desired network element. Signaling information may also be provided from SCP 22 through either STP 18 or signaling network gateway device 12, depending on the particular configuration of signaling network 10, to local digital switch 32, in either the first format or some second format, indicating that the line to the user is busy. This will present a busy signal or cause other call treatment to other parties attempting to establish a connection with the user through local digital switch 32.

When setting up the network element, a signaling network gateway device could be provided to establish access in a manner similar to what was just described. For example, assuming that a remote user desires to establish a connection with a user of local central office 16 through a local network element, the remote SCP and STP may provide the signaling information to STP 18 in a first format which then uses SCP 22 to generate translation and routing type signaling information in a first format to complete the connection. This signaling information may then be provided to the desired network element through signaling network gateway device 12 to provide the signaling information in any of a variety of second formats to the selected network element, such as broadband edge switch 30.

The present invention may be used for a variety of other operations such as by using signaling network gateway device 12 to allow non-traditional signaling end points to exchange signaling information to control signaling network 10. In such a case, signaling information requesting a particular service or network connection may be communicated by a user from an access element, such as private network 24, to signaling network gateway device 12 in a second format. Private network 24 may be a private branch exchange (PBX), an automatic call distributor (ACD), a computer network such as a local area network (LAN) or a wide area network (WAN), and the like. Signaling network gateway device 12 may then convert the signaling information from the second format to a first format and communicate the signaling information to STP 18 in the first format. The signaling information is then provided to SCP 22 where additional signaling information in the first format may be generated according to the service requested by the user. This provides substantial advantages by eliminating the need for providing expensive signaling transmission facilities to access the STPs directly and eliminating the need for expensive interface hardware at the STP.

Figure 2:
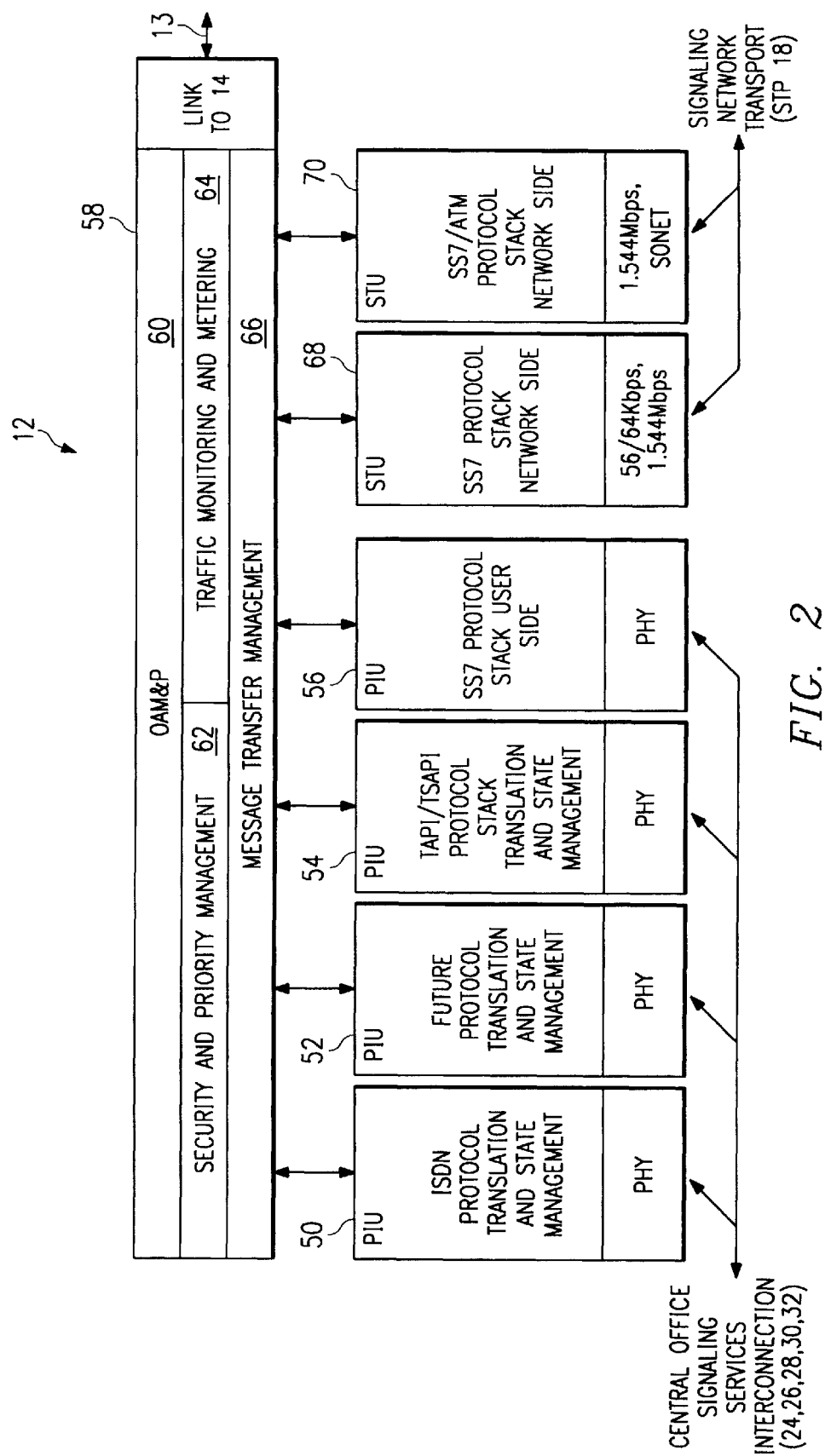
FIG. 2 is a functional block diagram illustrating an exemplary signaling network gateway device.

FIG. 2 is a functional block diagram illustrating signaling network gateway device 12 in more detail. As mentioned previously, signaling network gateway device 12 operates as the primary and may be implemented identically or similarly to signaling network gateway device 14 and thus the description of signaling network gateway device 12 also applies to signaling network gateway device 14. As illustrated in FIG. 2, information is exchanged with signaling network gateway device 14 through link 13. This information may include state of health information, configuration verification information, traffic assurance information, traffic statistics information, and usage based billing information.

Signaling network gateway device 12, generally, includes at least one protocol interface unit (PIU), at least one signaling transport unit (STU), and a signaling gateway control unit 58. Each of these units may be implemented in software or in a combination of software and hardware. The protocol interface unit converts signaling information between a first format and any number of second formats and then exchanges signaling information in any of the second formats with an access element of signaling network 10. In the embodiment of FIG. 2, the protocol interface unit includes an ISDN protocol interface unit 50, a future protocol interface unit 52, a TAPI/TSAPI protocol interface unit 54, and an SS7 protocol interface unit 56. Each of these individual protocol interface units may use protocol stacks in performing protocol translation and state management.

Each of these units may receive information from signaling gateway control unit 58 in a first signaling format, such as the SS7 signaling protocol, and convert the signaling information into the indicated second format. The signaling information in the second format may then be exchanged or provided to an access element that is designed or capable of communicating in the second format. Similarly, each of these units may receive signaling information from an associated access element in the indicated second format and convert the signaling information into a first format. The signaling information in the first format may then be exchanged with signaling gateway control unit 58.

SS7 protocol interface unit 56 is provided to indicate that the first format and the second format may be the same format and that, in such a case, the protocol interface unit would only need to provide minimal or no protocol conversion. Future protocol interface unit 52 is provided to indicate that signaling network gateway device 12 may be upgraded with additional functionality as new protocols are adopted, revised, and developed. In this manner, signaling network gateway device 12 can support virtually any and all future signaling protocols as they may be applied to operate and extend the functionality of access elements as the network control plane is expanded.

Signaling gateway control unit 58 provides the overall management of signaling network gateway device 12 and controls the exchange of signaling information in the first format between the signaling transport units and the protocol interface units. In the embodiment shown in FIG. 2, signaling gateway control unit 58 includes various modules such as an OAM&P module 60, a security and priority management module 62, a traffic monitoring and metering module 64, and a message transfer management module 66. OAM&P module 60 performs general operations, administration, maintenance, and provisioning functions that may be accessed through a serial port and, along with message transfer management module 66, controls the exchange of signaling information in the first format or SS7 signaling protocol between the protocol interface unit and the signaling transport unit.

Security and priority management module 62 may be used to analyze the signaling information to provide network security functions to ensure that a user is not requesting to perform network functions that may be dangerous or adverse to the operation and reliability of signaling network 10. If a user directly accesses signaling network gateway device 12, security and priority management module 62 may provide firewall or gateway screening to prevent unauthorized users from accessing the network. Furthermore, signaling network gateway device 12 provides priority management to ensure that certain users do not over utilize the network beyond their priority or level of service. Users or access elements may be assigned traffic flow priority for specific traffic types and traffic flow associations. Certain users may be given (assigned) priority for critical services.

Traffic monitoring and metering module 64 monitors the operation of signaling network gateway device and generates network statistics through metering. The statistics may be used to make decisions on priority management and to provide network overload protection. The statistics may also be used to measure the effect of a user on the network and to generate an associated bill for the associated usage of the network.

Finally, the signaling transport unit performs link speed conversion on the signaling information in the first format so that the signaling information may be exchanged with STP 18 through link 15 of signaling network 10 at a desired rate. In the embodiment of FIG. 2, the signaling transport unit includes an SS7 signaling transport unit 68 and an SS7/ATM signaling transport unit 70. Although only two individual signaling transport units are shown, it should be understood that any number of signaling transport units may be provided to support any available transport rate and protocol.

SS7 signaling transport unit 68 may exchange information in the SS7 format at various digital signal levels. For example, SS7 signaling transport unit 68 may perform link speed conversion to transport the signaling information at DS0 or DS0-A rate of 56/64 Kbps or at a DS1 rate of 1.544 Mbps. Similarly, SS7/ATM signaling transport unit 70 may provide SS7 signaling information in ATM cells at SONET rates using link 15 implemented using a fiber optic cable. The signaling transport unit allows signaling information to be provided in a first format from the primary signaling network gateway device to an associated STP over a high-speed transport link or facility. The signaling transport unit allows link speed conversion to be performed on the signaling information provided from the plurality of protocol interface units through signaling gateway control unit 58.

Thus, it is apparent that there has been provided, in accordance with the present invention, a signaling network gateway device and method for use in a signaling network, such as a Signaling System 7 network, that satisfy the advantages set forth above. Although the preferred embodiment has been described in detail, it should be understood that various changes, substitutions, and alterations can be made herein without departing from the scope of the present invention. For example, although the present invention has been described and illustrated with the signaling network gateway device being provided at a local central office, it should be understood that the present invention is in no way limited to the signaling network gateway device being provided only at a local central office. Also, the firewall and security modules or units of the signaling network gateway device may be provided as discrete or separate modules or units without departing from the present invention. The signaling network gateway device of the present invention may perform additional functions than those illustrated herein and may be organized differently than as illustrated in the one embodiment of the present invention illustrated herein. Furthermore, the direct connections illustrated herein could be altered by one skilled in the art such that two devices or elements are merely coupled to one another through an intermediate device or devices, without being directly connected, while still achieving the desired results demonstrated by the present invention. For example, an intermediate device or module may be provided between a signaling network gateway device and a user access element without departing from the scope of the present invention. Other examples of changes, substitutions, and alterations are readily ascertainable by one skilled in the art and could be made without departing from the spirit and scope of the present invention as defined by the following claims.

What is claimed is:

1. A signaling network gateway device for use in a signaling network comprising:
    a protocol interface unit operable to convert signaling information between a first format and a second format, the protocol interface unit operable to exchange signaling information in the second format with an access element providing communications with a telecommunication user;
    a signaling transport unit operable to perform link speed conversion on the signaling information in the first format, the signaling transport unit operable to exchange signaling information in the first format with a transport signaling link of the signaling network at a desired rate; and
    a signaling gateway control unit operable to control an exchange of signaling information in the first format between the signaling transport unit and the protocol interface unit.

2. The signaling network gateway device of claim 1, wherein the first format is Signaling System 7.

3. The signaling network gateway device of claim 1, wherein the second format is Telephony Application Programming Interface.

4. The signaling network gateway device of claim 1, wherein the second format is Telephony Services Applications Programming Interface.

5. The signaling network gateway device of claim 1, wherein the second format is an Integrated Services Digital Network signaling protocol.

6. The signaling network gateway device of claim 1, wherein the second format is a Transaction Language format.

7. The signaling network gateway device of claim 1, wherein the second format is X.25.

8. The signaling network gateway device of claim 1, wherein the first format and the second format are the same format.

9. The signaling network gateway device of claim 1, wherein the first format and the second format are Signaling System 7.

10. The signaling network gateway device of claim 1, wherein the signaling information is exchanged between the signaling gateway control unit and the signaling transport unit at a digital signal level one rate, and the signaling information is exchanged between the signaling transport unit and the transport signaling link at a digital signal level three rate.

11. The signaling network gateway device of claim 1, wherein the signaling information is exchanged between the signaling gateway control unit and the signaling transport unit at a digital signal level one rate, and the signaling information is exchanged between the signaling transport unit and the transport signaling link at a Synchronous Optical Network rate and the transport signaling link uses an optical fiber transmission system.

12. The signaling network gateway device of claim 1, wherein the signaling transport unit is operable to perform the link speed conversion on the signaling information so that the signaling information may be exchanged with the transport signaling link of the signaling network at any one of a plurality of rates.

13. The signaling network gateway device of claim 1, wherein the protocol interface unit includes a plurality of protocol interface units each operable to convert signaling information between a first format and one of a plurality of second formats and to exchange the signaling information in the one of the plurality of second formats with a corresponding access element of the signaling network, wherein the signaling gateway control unit is operable to control the exchange of signaling information in the first format between the signaling transport unit and the plurality of protocol interface units, and wherein the signaling transport unit is operable to perform link speed conversion on the signaling information provided from the plurality of protocol interface units through the signaling gateway control unit so that the signaling information may be exchanged with the transport signaling link of the signaling network at a desired rate.

14. The signaling network gateway device of claim 1, wherein the signaling gateway control unit performs operation, administration, maintenance, and provisioning functions for the signaling network when controlling the exchange of signaling information in the first format between the signaling transport unit and the protocol interface unit.

15. The signaling network gateway device of claim 1, wherein the signaling gateway control unit is implemented using a processor controlled by software.

16. The signaling network gateway device of claim 1, wherein the signaling gateway control unit analyzes the signaling information to ensure access rights to the network.

17. The signaling network gateway device of claim 1, wherein the signaling gateway control unit analyzes the signaling information and assigns traffic flow priority for specific traffic types and traffic flow associations.

18. The signaling network gateway device of claim 1, wherein the signaling gateway control unit analyzes the signaling information to generate traffic statistics.

19. The signaling network gateway device of claim 1, wherein the protocol interface unit is further operable to convert signaling information between a first format and any one of a plurality of second formats.

20. A signaling network comprising:
- a local digital switch operable to exchange signaling information in a first format;
- a signaling network gateway device operable to exchange signaling information in the first format and a second format;
- a signaling transfer point operable to exchange signaling information in the first format, the signaling transfer point operable to exchange signaling information with the local digital switch and the signaling network gateway device in the first format;
- a service control point in communication with the signaling transfer point and operable to provide translation and routing type signaling information in the first format in response to receiving signaling information from the signaling transfer point;
- a network element operable to exchange signaling information with the signaling transfer point in the first format; and
- an access element operable to exchange signaling information with the signaling network gateway device in the second format, the access element operable to provide communications with a telecommunications user.

21. The signaling network of claim 20, wherein the access element is a local signaling end point.

22. The signaling network of claim 20, wherein the access element is a digital loop carrier.

23. The signaling network of claim 20, wherein the network element is a second signaling transfer point.

24. The signaling network of claim 20, wherein the network element is an access tandem switch.

25. The signaling network of claim 20, wherein the network element is a broadband network element.

26. The signaling network of claim 20, wherein the first format is Signaling System 7.

27. The signaling network of claim 20, wherein the second format is a computer telephony signaling protocol.

28. The signaling network of claim 20, wherein the second format is an Integrated Services Digital Network signaling protocol.

29. The signaling network of claim 20, wherein the first format and the second format are the same.

30. The signaling network of claim 20, wherein the signaling network gateway device and the signaling transfer point are in communication through a high-speed signaling transport link.

31. The signaling network of claim 20, further comprising:
- a second signaling network gateway device operable to serve as a backup signaling network gateway device and in communication with the signaling network gateway device.

32. The signaling network of claim 20, wherein the local digital switch is further operable to exchange signaling information with the signaling network gateway device in the first format and the second format.

33. The signaling network of claim 20, wherein the signaling transfer point is a packet switch.

34. The signaling network of claim 20, wherein the service control point includes service logic programs and the service control point is further operable to execute the service logic programs to generate signaling information in a first format that anticipates the conversion of the signaling information between a first format and the second format at the signaling network gateway device.

35. A signaling network comprising:
- a local digital switch operable to exchange signaling information in a first format;
- a signaling network gateway device operable to exchange signaling information in the first format and a second format, the signaling network gateway device operable to exchange signaling information with the local digital switch in the first format;
- a signaling transfer point operable to exchange signaling information in the first format, the signaling transfer point operable to exchange signaling information with the network gateway device in the first format;
- a service control point in communication with the signaling transfer point and operable to provide translation and routing type signaling information in the first format in response to receiving signaling information from the signaling transfer point;
- a network element operable to exchange signaling information with the signaling transfer point in the first format; and
- an access element operable to exchange signaling information with the signaling network gateway device in the second format, the access element operable to provide communications with a telecommunications user.

36. The signaling network of claim 35, wherein the local digital switch is operable to exchange signaling information in the first format and the second format, and wherein the signaling network gateway device is operable to exchange signaling information with the local digital switch in the first format and the second format.

37. A method for using a signaling network gateway device in a signaling network comprising the steps of:
- communicating signaling information from an access element to a local digital switch, the access element operable to provide communications with a telecommunications user;
- communicating the signaling information from the local digital switch to a signaling transfer point in a first format;
- communicating the signaling information from the signaling transfer point to a service control point in the first format;
- generating translation and routing type signaling information in the first format;
- communicating the translation and routing type signaling information from the service control point to the signaling transfer point in the first format;
- communicating the translation and routing type signaling information from the signaling transfer point to a signaling network gateway device and a network element in the first format;
- converting the translation and routing type signaling information from the first format to a second format in the signaling network gateway device; and
- communicating the translation and routing type signaling information from the signaling network gateway device to an access element in the second format.

38. The method of claim 37, wherein the first format and the second format are the same.

39. The method of claim 37, wherein the second format is a computer telephony signaling protocol and the access element includes a computer.

40. The method of claim 37, further comprising the step of:

communicating signaling information to the local digital switch indicating that a line is busy.

41. A method for using a signaling network gateway device in a signaling network comprising the steps of:

communicating signaling information from an access element to a local digital switch, the access element operable to provide communications with a telecommunications user;

communicating the signaling information from the local digital switch to a signaling network gateway device in a first format;

communicating the signaling information from the signaling network gateway device to a signaling transfer point in the first format;

communicating the signaling information from the signaling transfer point to a service control point in the first format;

generating translation and routing type signaling information in the first format;

communicating the translation and routing type signaling information from the service control point to the signaling transfer point in the first format;

communicating the translation and routing type signaling information from the signaling transfer point to the signaling network gateway device and a network element in the first format;

converting the translation and routing type signaling information from the first format to a second format in the signaling network gateway device; and communicating the translation and routing type signaling information from the signaling network gateway device to an access element in the second format.

42. A method for using a signaling network gateway device in a signaling network comprising the steps of:

communicating signaling information from an access element to a signaling network gateway device in a second format, the access element operable to provide communications with a telecommunications user;

converting the signaling information from the second format to a first format in the signaling network gateway device;

communicating the signaling information from the signaling network gateway device to a service control point in the first format; and generating signaling information in the first format at the service control point.

43. The method of claim 42, wherein the step of generating signaling information includes generating signaling information in the first format that anticipates the conversion of the signaling information between a first format and the second format at the signaling network gateway device.

* * * * *

UNITED STATES PATENT AND TRADEMARK OFFICE
CERTIFICATE OF CORRECTION

PATENT NO.    : 6,081,591
DATED         : June 27, 2000
INVENTOR(S)   : Frederick H. Skoog It is certified that error appears in the above-identified patent and that said Letters Patent is hereby corrected as shown below:

Column 15,
Lines 8-10, cancel text beginning with "a signaling network" to and ending with "a second format", and insert the following -- a signaling network gateway device operable to perform link speed conversion and to exchange signaling information in the first format and a second format --.

Column 16,
Lines 8-12, cancel text beginning with "a signaling network gateway" to and ending with "in the first format", and insert the following -- a signaling network gateway device operable to exchange signaling information in the first format and a second format, the signaling network gateway device operable to perform link speed conversion and to exchange signaling information with the local digital switch in the first format --.
Lines 35-62, cancel text beginning with "37. A method" to and ending with "in the second format", and insert the following claim:

37. A method for using a signaling network gateway device in a signaling network comprising the steps of:
    communicating signaling information from an access element to a local digital switch, the access element operable to provide communications with a telecommunications user;
    communicating the signaling information from the local digital switch to a signaling transfer point in a first format;
    communicating the signaling information from the signaling transfer point to a service control point in the first format;
    generating translation and routing type signaling information in the first format;
    communicating the translation and routing type signaling information from the service control point to the signaling transfer point in the first format;
    communicating the translation and routing type signaling information from the signaling transfer point to a signaling network gateway device and a network element in the first format;
    converting the translation and routing type signaling information from the first format to a second format in the signaling network gateway device;
    performing a link speed conversion on the signaling information; and
    communicating the translation and routing type signaling information from the signaling network gateway device to an access element in the second format.

Column 17,
Lines 5-7, cancel text beginning with "41. A method" to and ending with "in the second format", and insert the following claim:

41. A method for using a signaling network gateway device in a signaling network comprising the steps of:
    communicating signaling information from an access element to a local digital switch, the access element operable to provide communications with a telecommunications user;
    communicating the signaling information from the local digital switch to a signaling network gateway device in a first format;
    communicating the signaling information from the signaling network gateway device to a signaling transfer point in the first format;
    communicating the signaling information from the signaling transfer point to a service control point in the first format;

UNITED STATES PATENT AND TRADEMARK OFFICE
CERTIFICATE OF CORRECTION

PATENT NO. : 6,081,591
DATED : June 27, 2000
INVENTOR(S) : Frederick H. Skoog

It is certified that error appears in the above-identified patent and that said Letters Patent is hereby corrected as shown below:

Column 17 (cont'd),
generating translation and routing type signaling information in the first format;
communicating the translation and routing type signaling information from the service control point to the signaling transfer point in the first format;
communicating the translation and routing type signaling information from the signaling transfer point to the signaling network gateway device and a network element in the first format;
converting the translation and routing type signaling information from the first format to a second format in the signaling network gateway device;
performing a link speed conversion on the signaling information; and
communicating the translation and routing type signaling information from the signaling network gateway device to an access element in the second format.

Column 18,
Lines 7-22, cancel text beginning with "42. A method" to and ending with "control point", and insert the following claim:

42. A method for using a signaling network gateway device in a signaling network comprising the steps of:
communicating signaling information from an access element to a signaling network gateway device in a second format, the access element operable to provide communications with a telecommunications user;
converting the signaling information from the second format to a first format in the signaling network gateway device;
performing a link speed conversion on the signaling information;
communicating the signaling information from the signaling network gateway device to a service control point in the first format; and
generating signaling information in the first format at the service control point.

Signed and Sealed this

Seventh Day of February, 2006

JON W. DUDAS
*Director of the United States Patent and Trademark Office*